UNITED STATES PATENT OFFICE.

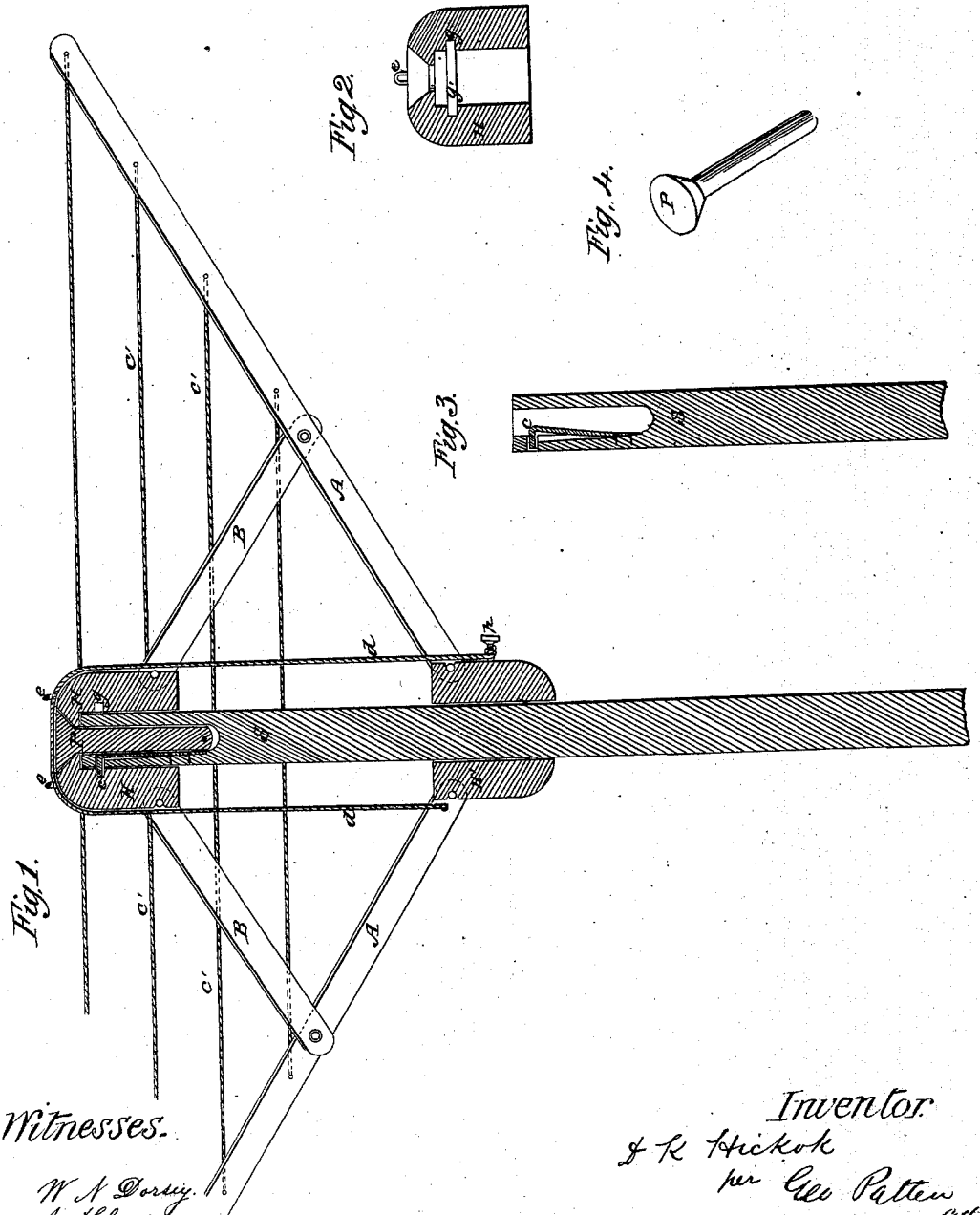

D. K. HICKOK, OF MORRISVILLE, VERMONT.

CLOTHES-DRIER.

Specification of Letters Patent No. 26,496, dated December 20, 1859.

*To all whom it may concern:*

Be it known that I, D. K. HICKOK, of Morrisville, in the county of Lamoille and State of Vermont, have invented a new and useful Improvement in Clothes-Driers; and I do hereby declare that the following is a full, clear, and exact description of the same, reference being had to the annexed drawing, forming part of this specification, in the several figures of which similar characters of reference denote the same part.

Figure 1 is a vertical section through the center of the clothes drier. Fig. 2 is a section through the center of the upper hub. Fig. 3 is a section through the axis of the shaft showing the arrangement of the spring catch. Fig. 4 is a perspective view of the headed pin.

The nature of the invention consists in having the shaft of the drier hollow at the head for the admission of a headed pin which passes through the upper hub to confine it on the shaft. In this hollow shaft is a spring catch having its end projecting through an opening in the side of the shaft and catching in a groove in the inside of the upper hub, which is grooved to receive it, so that when the pin is placed in the shaft it pushes the spring catch through the opening in the shaft into the groove in the hub and prevents the hub from slipping off the shaft. And there is a cord fastened to one side of the lower hub, passing through eyes on the top of the upper hub and fastened to a pin on the other side of the lower hub, which serves the double purpose of keeping the frame stretched tight, and also of keeping the pin down firmly in the shaft, and prevent it and consequently the hubs from coming off the shaft. When desired the cord may be loosened, the pin taken out, and the hubs and frame taken off the shaft.

In the drawing S, is the hollow headed shaft, having the spring catch $c$, P, the headed pin passing through the upper hub H, into shaft S, $g$ the groove on the inside of hub H, to receive the springcatch $c$, and $d$, the cord from one side of the lower hub H', passing through eyes $e$, on top of hub H, and secured to pin $p$, on the other side.

When in use the hubs are placed on the shaft, the pin P, is inserted through hub H, into the hollow of shaft S, pushing the projection of springcatch $c$, into the groove $g$ of hub H, thereby confining it in place on the shaft but not preventing it from revolving on the shaft as the groove extends entirely around it. And the cord $d$, passing across the top of the pin P, not only serves to keep the frame in a tight condition when stretched, but also keeps the pin from slipping out, thus assisting in keeping the frame firmly in position on the shaft. When not in use the cord $d$, may be loosened and the pin P, taken out, when the spring catch flies in from the groove in the hub allowing the whole frame to be removed from the shaft and put out of the way, thus adding to its portability and convenience.

I do not claim the cord fastening nor any of the parts separately considered, but

I claim—

The internally grooved hub H, and springcatch $c$, in combination with hollow headed shaft S, headed pin P, and securing cord $d$, substantially as and for the purpose set forth, when arranged with hub H', braces B, arms A, and cord $c'$.

In testimony whereof I have hereunto signed my name before two subscribing witnesses.

D. K. HICKOK.

Witnesses:
JOHN MILES,
GEO. A. MILES.